(12) United States Patent
Shen et al.

(10) Patent No.: US 6,493,491 B1
(45) Date of Patent: Dec. 10, 2002

(54) OPTICAL DROP CABLE FOR AERIAL INSTALLATION

(75) Inventors: Steven X. Shen, Hickory, NC (US); Brian G. Risch, Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/671,747

(22) Filed: Sep. 28, 2000

Related U.S. Application Data

(60) Provisional application No. 60/156,436, filed on Sep. 28, 1999.

(51) Int. Cl.$^7$ ................................. G02B 6/44
(52) U.S. Cl. .................. 385/113; 385/100; 385/109
(58) Field of Search ................... 385/100–113

(56) References Cited

U.S. PATENT DOCUMENTS

| | | | |
|---|---|---|---|
| 4,148,560 A | * 4/1979 | Margolis | 350/96.23 |
| 4,195,906 A | 4/1980 | Dean et al. | 385/113 |
| 4,199,225 A | * 4/1980 | Slaughter et al. | 385/113 |
| 4,262,703 A | 4/1981 | Moore et al. | 138/115 |
| 4,420,220 A | * 12/1983 | Dean et al. | 385/113 |
| 4,611,656 A | 9/1986 | Kendall, Jr. et al. | 166/65.1 |
| 4,761,053 A | 8/1988 | Cogelia et al. | 385/113 |
| 5,043,037 A | 8/1991 | Buckland | 156/166 |
| 5,125,063 A | 6/1992 | Panuska et al. | 385/113 |
| 5,155,304 A | 10/1992 | Gossett et al. | 174/117 R |
| 5,165,003 A | * 11/1992 | Carter | 385/112 |
| 5,180,890 A | 1/1993 | Pendergrass et al. | 174/117 F |
| 5,196,259 A | 3/1993 | Pierini et al. | 428/245 |
| RE34,516 E | 1/1994 | Houghton | 385/103 |
| 5,508,376 A | 4/1996 | Dang et al. | 528/328 |
| 5,552,221 A | 9/1996 | So et al. | 428/373 |
| 5,673,352 A | 9/1997 | Bauer et al. | 385/114 |
| 5,802,231 A | * 9/1998 | Nagano et al. | 385/114 |
| 5,825,956 A | 10/1998 | Missout et al. | 385/102 |
| 5,911,023 A | * 6/1999 | Risch et al. | 385/100 |
| 5,922,259 A | 7/1999 | Okuyama et al. | 264/103 |
| 5,948,186 A | 9/1999 | Yabuki | 152/527 |
| 5,982,966 A | 11/1999 | Bonicel | 385/100 |
| 5,993,963 A | 11/1999 | Teramoto et al. | 428/364 |
| 5,999,676 A | 12/1999 | Hwang | 385/106 |
| 6,134,363 A | * 10/2000 | Hinson et al. | 385/100 |
| 6,198,865 B1 | * 3/2001 | Risch | 385/113 |

FOREIGN PATENT DOCUMENTS

JP          9-127380          5/1997

OTHER PUBLICATIONS

Understanding Fiber Optics, Jeff Hecht, Jun. 1999, Prentice Hall, 3rd edition, pp. 143–159.*

* cited by examiner

*Primary Examiner*—Brian Sircus
*Assistant Examiner*—Michael C. Zarroli
(74) *Attorney, Agent, or Firm*—Sughrue Mion, PLLC

(57) ABSTRACT

An aerial drop cable comprises a jacket surrounding a cavity containing a least one loosely housed optical fiber and a pair of reinforcing members composed of a plurality of high modulus fibers such as polybenzoxazole (PBO) fibers. The cross-sectional area of the reinforcing members is larger than the cross-sectional area of the cavity so that the optical fiber disposed in the cavity is protected from lateral compressive forces. By utilizing reinforcing members which are composed of PBO fibers, the diameter of the reinforcing members is reduced as compared with conventional reinforcing members composed of aramid, metal or glass thereby providing a substantial reduction in the amount of jacketing material and the weight of the cable. Further, the bending strain of the cable utilizing PBO reinforcing members is substantially reduced for an equivalent bending radius as compared with cables utilizing conventional reinforcing members due to the smaller diameter of the reinforcing members. Therefore, the bending radius of the cable is reduced providing greater flexibility for routing the cable.

32 Claims, 1 Drawing Sheet

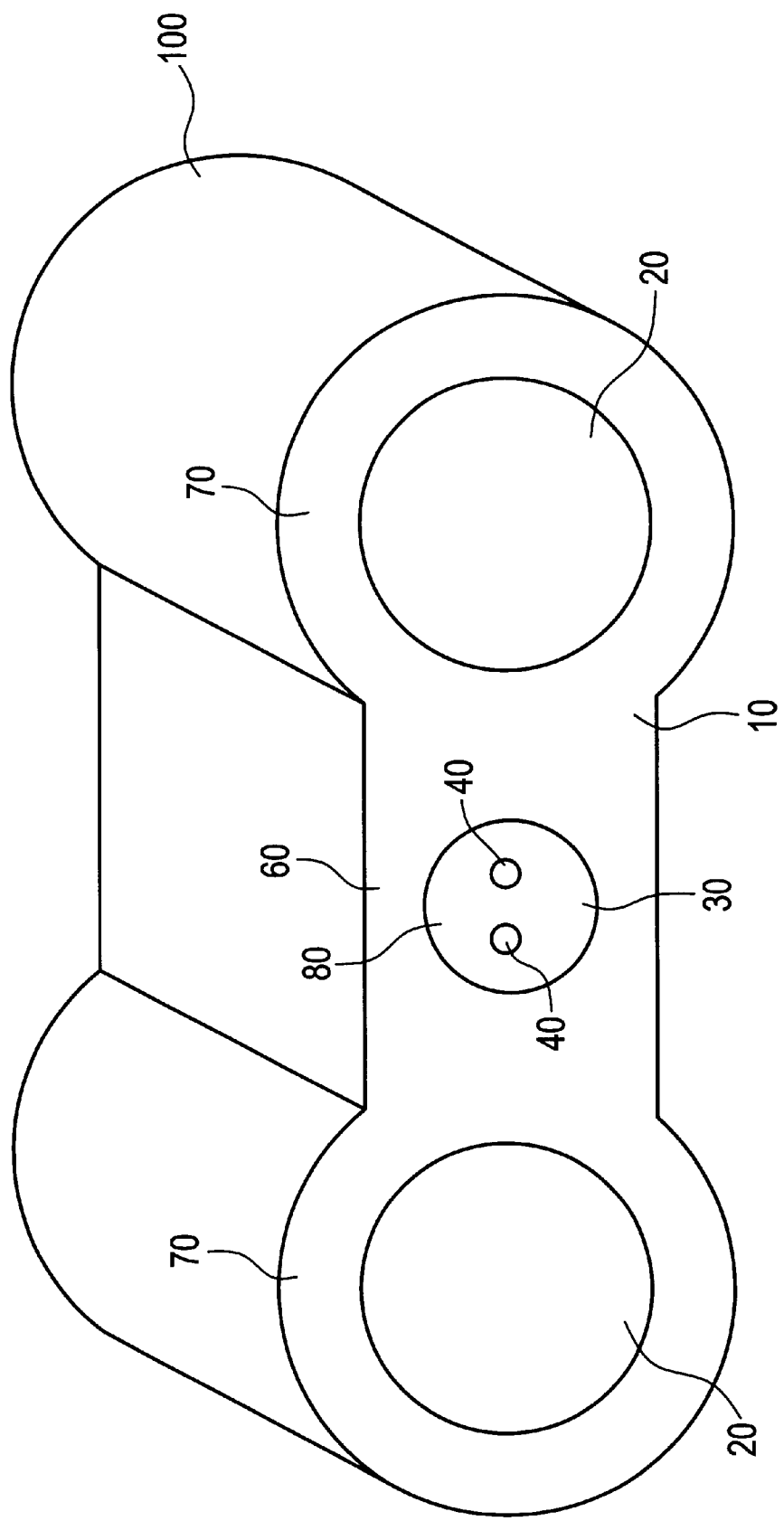

OPTICAL DROP CABLE FOR AERIAL INSTALLATION

This application claims benefit of provisional application 60/156,436 filed Sep. 28, 1999.

FIELD OF THE INVENTION

The present invention relates to an aerial drop cable with reduced weight and improved specific strength. In particular, the present invention relates to an optical fiber aerial drop cable including reinforcement strength members containing high modulus materials such as poly(p-phenylene-2,6-bezobisoxazole) or carbon fibers disposed on opposites sides of a central cavity containing one or more loose optical fibers wherein the strength members protect the optical fibers from compressive loads.

BACKGROUND OF THE INVENTION

With the advent of new technologies and lower prices, the introduction of fiber optic installation in residential homes or "Fiber-To-The-Home" (FTTH) is coming closer to reality. In a passive optical network, small optical cables containing only a few fibers will be deployed directly onto customer premises for providing video, data and voice connections with superior quality and bandwidth. The optical cables need to be designed with appropriate materials so that long term fiber and cable reliability are obtained at a cost that is acceptable for the distribution market.

Conventional copper cables have limited data transmission bandwidth and are subject to electromagnetic interference. Conventional optical fiber cables are designed for different applications and thus, do not have the features which are required for FTTH applications such as compatibility with existing hardware, self-support over large distances, and low flammability. In the past, plastic compounds which are typically used in copper drop cables have not been selected to ensure reliability for fiber optic telecommunication cables. For example, the carbon black content and U.V. absorption requirements for copper drop cables are far lower than the requirements for fiber optic cables. Polyvinyl chloride (PVC) jacketing compounds for copper drop cables contain only 0.5% carbon black by weight, whereas Bellcore GR-20 Issue 2 standards require 2.6%±0.25% carbon black and an ultraviolet (U.V.) absorption coefficient of at least 400 at 375 nm. A high U.V. absorption coefficient is required to ensure U.V. resistance and a long service lifetime for the more expensive fiber optic cables and to protect light sensitive fibers from U.V. radiation when thin jackets are used. Additionally, materials that are non-reactive with optical fiber performance and/or fiber coating reliability must be selected. Use of traditional phthalate plasticized PVC materials can result in plasticizer migration to the fiber coatings which can result in a decrease in coating adhesion (as measured by coating strip force) and possible coating delamination resulting in catastrophic fiber failure.

Unlike copper drop cables, the presence of water and hydrogen in fiber optic drop cables is a significant concern. In particular, the presence of water or hydrogen in fiber optic drop cables can result in attenuation increases. Therefore, the fiber optic drop cables must be designed to prevent water ingression into the cable and the fiber optic drop cables must utilize materials that do not generate or release hydrogen.

Conventional aerial drop cables may be reinforced by metallic materials such as steel or copper, or non-conductive materials such as carbon fibers, aramid fibers, or glass reinforced epoxy rods. For example, U.S. Pat. No. 4,199,225 discloses an optical cable which utilizes a pair of steel or carbon fiber reinforcing wires disposed on opposite sides of a bore housing optical fibers in order to provide longitudinal support and protection against a crushing force applied to the optical cable. U.S. Pat. No. 4,199,225 discloses an optical cable which utilizes a pair of reinforcing members such as steel wire or carbon fiber disposed on opposite sides of a bore housing optical fibers in order to provide longitudinal support and protection against a crushing force applied to the optical cable. U.S. Pat. No. 5,673,352 discloses a fiber optic micro cable which includes reinforcing members manufactured of metal wire or non-conductive materials such as fiberglass, reinforced plastic or other dielectric materials. Similarly, U.S. Pat. No. 4,761,053 discloses an aerial service wire which utilizes a pair of strength members composed of a fibrous stranded material such as fiberglass or aramid fibers which are impregnated with a plastic material.

Aramid reinforced rods provide a high modulus and tenacity (e.g., Kevlar® aramid fiber manufactured by Du Pont Corporation has a modulus of 120 GPa and a tenacity of 24 g/D). Although aramid fibers are relatively expensive, aramid reinforced rods provide a higher modulus and lower weight than glass reinforced rods. Currently, aramid is the highest specific modulus material which is commercially available and utilized for reinforcement of composite strength members in dielectric cables.

The self-support span length of an aerial drop cable is very sensitive to the size and weight of the cable. As a result, attempts to achieve a longer span length by increasing the size of a reinforcement member (e.g., glass reinforced epoxy) may be compromised by increases in the cable weight and size. In particular, conventional cable materials may have a density greater than 1.2 g/cc which requires the use of heavier reinforcing members due to the higher cable weight. Moreover, the higher density increases the overall cable weight and cost and decreases cable flexibility. Accordingly, in order to maintain the cable elongation in a limited range, which is critical for fiber long term reliability, the only way to achieve long span requirements is by using higher modulus materials in the reinforcing members.

In view of the disadvantages of conventional aerial drop cables, it is an object of the present invention to provide an aerial drop cable using all dielectric components with reduced weight and size in order to increase span length and decrease ice and wind loading.

It is a further object of the present invention to provide an aerial drop cable with reduced bending strain for improved cable routability.

SUMMARY OF THE INVENTION

The present invention is adapted to achieve the foregoing objects. In accomplishing these objects, the present invention provides an aerial drop cable comprising a jacket surrounding a cavity containing a least one loosely housed optical fiber and a pair of reinforcing members composed of a high modulus material.

According to the present invention, the jacket comprises a central portion in which the cavity is disposed and two end portions in which the reinforcing members are disposed. In order to protect the optical fiber within the cavity from lateral compressive forces, the vertical thickness of the central portion of the cavity is smaller than the vertical thickness of the end portions and the cross-sectional area of the reinforcing members is larger than the cross-sectional area of the central cavity. As a result, when a lateral compressive force is applied to the aerial drop cable, the compressive force is absorbed by the end portions of the jacket and the reinforcing members. Further, by loosely housing the optical fiber in the cavity, the optical fiber is provided with freedom of movement and thus, is less prone to the bending losses introduced by stresses imposed on the cable in an outside environment.

In accordance with a preferred embodiment of the present invention, the reinforcing members are composed of polybenzoxazole (PBO) fibers. As a result, the diameter of the PBO reinforcing members is reduced as compared with conventional reinforcing members composed of aramid, metal or glass thereby providing a substantial reduction in the amount of jacketing material and the weight of the cable. Further, the bending strain of the cable utilizing PBO reinforcing members is substantially reduced for an equivalent bending radius as compared with cables utilizing conventional reinforcing members due to the smaller diameter of the reinforcing members- Therefore, the bending radius of the cable is reduced providing greater flexibility for routing the cable indoors.

The above and other features of the invention including various and novel details of construction will now be more particularly described with reference to the accompanying drawing and pointed out in the claims. It will be understood that the particular aerial drop cable embodying the present invention is shown by way of illustration only and not as a limitation of the invention. The principles and features of this invention may be employed in varied and numerous embodiments without departing from the scope of the invention.

BRIEF DESCRIPTION OF THE DRAWINGS

These and other features, aspects and advantages of the present invention will become better understood with reference to the following detailed description, appended claims, and accompanying drawing, wherein:

FIG. 1 illustrates a cross-sectional view of the aerial drop cable.

DESCRIPTION OF THE PREFERRED EMBODIMENTS

Referring to FIG. 1, an optical fiber aerial drop cable in accordance with a preferred embodiment of the present invention will be described. The aerial drop cable 100 comprises a jacket 10, a pair of reinforcement members 20, an optical fiber cavity 30, and one or more optical fibers 40 which are loosely housed in the optical fiber cavity 30. The jacket 10 includes a central portion 60 in which the optical fiber cavity 30 is disposed and two end portions 70 in which the reinforcing members 20 are respectively disposed. In particular, the optical fiber cavity 30 is centrally positioned between the reinforcing members 20 and extends in a longitudinal direction of the cable 100. In order to protect the optical fibers 40 from lateral compressive forces, the thickness of the central portion 60 in the vertical direction is smaller than the. thickness of the end portions 70. Further, the reinforcement members 20 have a larger diameter than the optical fiber cavity 10 so that when a lateral compressive force is applied to the cable 100 the compressive force is concentrated first to the reinforcing members 20 rather than the optical fibers 40 in the optical fiber cavity 30. In other words, when viewed in a transverse cross section, the cross-sectional area of the reinforcing members 20 and the end portions 70 of the jacket are larger than the cross sectional area of the optical fiber cavity 10 and the central portion 60 of the jacket, respectively, so that the overall cross section of the cable 50 has a "dog bone" shape. Since external compressive forces are initially distributed to the end portions 70 and the reinforcing members 20,the compressive force applied to the optical fibers 40 housed in the optical fiber cavity 30 is minimized thereby protecting the optical fiber 40 from lateral compressive loads which are inevitable when using existing hardware to anchor the cable 100 during installation.

The cable 100 is formed using a minimum number of materials and components in order to reduce the weight and size. In particular, the jacket 10 is formed using a plastic material, e.g., polyvinyl chloride (PVC), polyethelene or polypropolyene, or copolymer thereof which does not contain platicizers which can migrate to the fiber coatings thereby reducing reliability and coating adhesion. Further, in the preferred embodiment, the material of the jacket 10 may be optimized by using cellular materials to reduce overall jacket density. The jacket 10 has material density which is less than or equal to 1.2 g/cc, an ultraviolet absorption coefficient of greater than 400 at 375 nm, a carbon black content greater than 2.3%, and a flammability requirement of VW-1 or greater.

The optical fibers 40 are loosely housed in the optical fiber cavity 30 without the use of buffer tube or support member so that the optical fibers 40 can move independently of each other. While the use of buffering material may provide additional protection to the fibers, it also increases the cable cost because of the additional materials and the manufacturing process of a buffered cable structure will require more equipment or multiple processing steps. The aerial drop cable of the present invention eliminates any unnecessary layers of extra protection and process steps to simplify the cable process and, reduce costs. Further, single mode fibers and different types of NZDS fibers are commonly used with longer transmission signal wavelength and provide higher bandwidth/dispersion performances. However, these fibers are more sensitive to macrobending and microbending losses. The loosely buffered design of the present invention provides the optical fibers 40 with more freedom of movement and thus, is less prone to the single losses introduced by stresses imposed on the aerial drop cable 100 in an outside environment.

In accordance with the preferred embodiment of the present invention, the aerial drop cable 100 has an excess fiber length (i.e., [(fiber length-cable length)/cable length] ×100) of 0.0 to 0.5% in order to provide fiber long-term reliability, and quality cable transmission performances under cold temperatures in an outside environment. Due to the characteristics of the aerial application, the aerial drop cable will elongate due to gravity effect and this effect will be enlarged by wind and ice load in addition to the actual cable weight. If the cable designed with no or negative EFL, (negative meaning fiber is shorter than cable, and thus stretched from beginning) due to the elongation aerial cable will experience, the fiber will be under constant tensile stress and strain. If this load or strain is larger than a critical value (GR 20 recommend <0.2% long-term fiber strain), the fiber will break before specified service life, causing a reliability issue. With an EFL of 0 to 0.5%, the fiber 40 housed in the cavity 30 will initially try to straighten out to exhaust EFL during cable elongation before the fiber 40 is subject to strain. This will reduce the fiber strain level under same amount of cable elongation, thus enhancing the fiber reliability. On the other hand, however, too much EFL designed into the cable is not a good thing either. The fiber accommodates EFL in the loose buffered cable by curling into- a helical or sinusoidal shape of path, introducing fiber bending. When fiber bending reaches certain level, the light signal will escape from the fiber waveguide at the bending location and cause signal loss. During a cable's service life, it will experience wide range of temperature variations (−50 C ~+70 C). The extreme cold temperature will cause cable to contract and increase the degree of fiber bending. If the cable has a large EFL, the high level of bending (worsened by cold temperature cable contraction) will increase the signal losses high enough to encumber regular network transmissions. Further, a large EFL is not economical since excess fiber increases cost. Accordingly, an optimized EFL range should be applied to obtain the best results for both product performance and economics.

In order to prevent water ingression in the optical fiber cavity 30, a material 80 such as a blocking gel or a superabsorbent material in the form of a tape, power or yarn may be added to the optical fiber cavity, 30. Examples of superabsorbent materials are polyacrylates with carboxylate functional groups, partially neutralized polyacrylic acid, polyamides, or copolymers thereof, e.g., a copolymer of acrylic acid and sodium acrylate. The reinforcing members 30 and cross-sectional profile provide protection to the optical fibers 40 against lateral compressive forces and are thus, compatible to the clamping type hardware presently utilized for copper drop wires. The cable design of the present invention maximizes the efficiency of the material usage so the cable is light in weight and small in size. The cable weight and size are critical factors to reduce ice and wind loading in aerial application in terms of sag and tension of the installed cables.

In accordance with the preferred embodiment of the present invention the reinforcing members 20 are manufactured using Poly(p-phenylene-2,6-bezobisoxazole) or polybenzoxazole (PBO) fibers. PBO fibers are manufactured under the trade-name of Zylon® by Toyobo Co. Ltd. PBO has a typical modulus of 270 GPa and a tenacity as high as 42 g/D. The specific modulus of PBO is 2.07 times greater than aramid thereby allowing reduced cable weight and increased span length. The use of stronger reinforcing materials also allows easier production since fewer yarn ends are required in the manufacture of a particular cable design. By utilizing PBO fibers, the diameter of the reinforcing members 20 is 50% smaller than an equivalent aramid rod. Materials with a high modulus (>200 GPa) and low density (<2.0 g/cc) such as PBO or carbon fibers are desired to achieve optimal span length.

Since the reinforcing members 20 are the largest components of the aerial drop cable, the reduction in the diameter of the reinforcing members 20 by utilizing PBO or carbon reinforced rods results in a substantial reduction in the amount of jacketing material and cable weight. Further, the bending strain of the cable utilizing smaller diameter reinforcing elements with a modulus above 200 GPa is substantially reduced for an equivalent bending radius as compared with cables utilizing conventional reinforcing members due to the smaller diameter of the reinforcing members. Therefore, the bending radius of the cable will be reduced providing greater flexibility for routing the cable indoors. Lastly, the inherent flame retardancy of PBO ensures good flame retardancy for the cable.

Table 1 below illustrates the different characteristics reinforcing members of conventional materials and PBO in dielectric self-support aerial drop cables, wherein the reinforcing member have a diameter of 1.8 mm. Table 2 provides a comparison among rigid reinforcing members made of different type of materials based on the characteristics listed in Table 1. Cables made of different types reinforcing members, but at same size (diameter), are compared with regards to the cable weights and maximum servicing spans (span: the distance between two poles where the cable is self-supporting) the cable is capable of under the different NESC loading conditions (light, medium and heavy). In particular, Table 2 shows the percentage increase of weight (i.e., (weight of material 1−weight of material 2)/ weight of material 1) and maximum spans between PBO and other conventional materials (i.e., (span of material 1−span of material 2)/span of material 1).

TABLE 1

| Reinforcing member material | Cable weight (kg/km) | Cable span under different N.E.S.C. loading conditions (Meters) | | |
|---|---|---|---|---|
| | | Light loading conditions | Medium loading conditions | Heavy loading conditions |
| Glass reinforced epoxy (GRP) | 28.7 | 75 | 43 | 23 |
| Aramid Reinforced Rod | 23.4 | 96 | 55 | 29 |
| PBO Reinforced Rod | 25.6 | 260 | 148 | 80 |
| Carbon Fiber Rod (CFR) | 27.4 | 179 | 103 | 57 |

TABLE 2

| Reinforcing member material | Cable weight % increase over base | Capable span increase % change | | |
|---|---|---|---|---|
| | | Light loading conditions | Medium loading conditions | Heavy loading conditions |
| CFR vs. Aramid | 17.09% | 86.5% | 87.3% | 96.6% |
| CFR vs. GRP | −4.53% | 139% | 140% | 148% |
| PBO vs. Aramid | 2.99% | 134% | 135% | 145% |
| PBO vs. GRP | −10.80% | 150% | 200% | 208% |

Because the design of aerial drop cable of the present invention utilizes optical fibers without buffer tubes or a buffer coat on the optical fibers, the cable may be manufactured using a single-step process from pay off of the optical fibers thereby providing the advantages of increased speed and efficiency, and low manufacture cost. The aerial drop cable of the present invention can be flexibly designed to meet different self-support spans and various loading requirements. The high modulus reinforcement members can be included as composite rods or in some combination of composite rods and yarns.

In accordance with the preferred embodiment of the present invention, the aerial drop 15 cable should conform to the requirements of Telcordia GR-20-CORE Genereic Requirements for Optical Fiber and Fiber Optic Cable, GR 409 Generic Requirements for Premises Fiber Optic Cable, GR 421 Generic Requirements for Metallic Telecommunication Cable, GR 492 421 Generic Requirements for Metallic Telecommunication Wire, IEEE Standard P1222 (draft), NFPA National Electrical Code, IEEE National Electrical Safety Code, and UL 1581 flammability requirement. In the preferred embodiment, the cable cross-section has a thickness which is less than or equal to 0.14 inches and a width which is less than or equal to 0.352 inches. The thickness of the jacket is less than 0.016 inches external to the reinforcing members 20 and less than or equal to 0.22 inches between the optical fiber cavity 30 and the reinforcing members 20. The nominal cable weight is 24.5 pounds per 1000 feet and have minimum bend radius of 4.5 inches under no load and 8.0 inches under load.

Although certain preferred embodiments of the present invention have been described, the spirit and scope of the invention is by no means restricted to what is described above.

What is claimed is:

1. An aerial optical cable comprising:

a jacket body;

a cavity disposed in a central portion the jacket body;

first and second reinforcing members disposed on opposite sides of said cavity in end portions of the jacket body, the cavity and the first and second reinforcing members extending longitudinally in a common plane, wherein said first and second reinforcing members have a cross-sectional area which is greater than a cross-sectional area of said cavity; and a plurality of optical fibers loosely housed in said cavity without the use of a buffer tube or support member so that said optical fibers can move independently of each other.

2. An aerial optical cable as claimed in claim 1, further comprising a water absorbent material disposed in said cavity and surrounding said optical fibers, said water absorbent material permitting said optical fibers to freely move within said cavity.

3. An aerial optical cable as claimed in claim 2, wherein said water absorbent material comprising one of polyacrylates with carboxylate functional groups, partially neutralized polyacrylic acid, and polyacrylamides, or copolymers of polyacrylates with carboxylate functional groups, partially neutralized polyacrylic acid, or polyacrylamides.

4. An aerial optical cable as claimed in claim 1, further comprising a gel material is disposed in said cavity and surrounding said optical fibers, said gel material permitting said optical fibers to freely move within said cavity.

5. An aerial optical cable as claimed in claim 4, wherein said gel material comprises at least one silicone, mineral, polyolefin, and a polyol oils combined with a polymeric thixotropy modifier of pyrogenic silica.

6. An aerial optical cable as claimed in claim 1, wherein said first and second reinforcing members comprise a non-conductive material.

7. An aerial optical cable as claimed in claim 6, wherein said non-conductive material comprises polybenzoxazole fibers.

8. An aerial optical cable as claimed in claim 6, wherein said non-conductive material comprises aramid fibers.

9. An aerial optical cable as claimed in claim 1, wherein said first and second reinforcing members comprise a metallic material.

10. An aerial optical cable as claimed in claim 1, wherein each of said optical fibers has an excess fiber length of 0.0 to 0.5%.

11. An aerial optical cable comprising:

a jacket body;

a cavity disposed in a central portion the jacket body;

first and second reinforcing members disposed on opposite sides of said cavity in end portions of the jacket body, the cavity and the first and second reinforcing members extending longitudinally in a common plane, wherein said first and second reinforcing members have a cross-sectional area which is greater than a cross-sectional area of said cavity; and at least one optical fiber loosely housed in said cavity, wherein said jacket body comprises a plastic material that does not contain phthalate platicizers which can migrate to a coating of said optical fiber.

12. An aerial optical cable as claimed in claim 11, wherein said plastic material comprises one of polyvinyl chloride, polyethelene and polypropolyene, or a copolymer comprising polyethelene and polypropolyene.

13. An aerial optical cable comprising:

a jacket body;

a cavity disposed in a central portion the jacket body;

first and second reinforcing members disposed on opposite sides of said cavity in end portions of the jacket body, the cavity and the first and second reinforcing members extending longitudinally in a common plane; and at least one optical fiber loosely housed in said cavity, wherein said first and second reinforcing members have a modulus greater than 200 GPa.

14. An aerial optical cable comprising:

a jacket body;

a cavity disposed in a central portion the jacket body;

first and second reinforcing members disposed on opposite sides of said cavity in end portions of the jacket body, wherein the cavity and the first and second reinforcing members extend longitudinally in a common plane and the first and second reinforcing members each comprise a plurality of polybenzoxazole fibers; and a plurality of optical fibers loosely housed in said cavity without the use of a buffer tube or support member so that said optical fibers can move independently of each other.

15. An aerial optical cable as claimed in claim 14, wherein said first and second reinforcing members have cross-sectional area which is greater than a cross-sectional area of said cavity.

16. An aerial optical cable as claimed in claim 14, further comprising a water absorbent material is disposed in said cavity and surrounding said optical fibers, said water absorbent material permitting said optical fibers to freely move within said cavity.

17. An aerial optical cable as claimed in claim 16, wherein said water absorbent material comprising polyacrylates with carboxylate functional groups, partially neutralized polyacrylic acid, polyacrylamides, or copolymers of the above; e.g. a copolymer of acrylic acid and sodium acrylate.

18. An aerial optical cable as claimed in claim 14, further comprising a gel material is disposed in said cavity and surrounding said optical fibers, permitting said optical fibers to freely move within said cavity.

19. An aerial optical cable as claimed in claim 18, wherein said gel material comprises comprising silicone, mineral, polyolefin, and/or a polyol oils combined with a polymeric thixotropy modifier of pyrogenic silica.

20. An aerial optical cable as claimed in claim 14, wherein said jacket body comprises a plastic material that does not contain phthalate platicizers which can migrate to a coating of said optical fibers.

21. An aerial optical cable as claimed in claim 20, wherein said plastic material comprises one of polyvinyl chloride, polyethelene and polypropolyene, or a copolymer comprising ethelene and propolyene.

22. An aerial optical cable as claimed in claim 14, wherein each of said optical fibers has an excess fiber length of 0.0 to 0.5%.

23. An aerial optical cable comprising:

a jacket body;

a cavity disposed in said jacket body;

an optical fiber housed in said cavity; and at least one reinforcing member disposed in said jacket body, said reinforcing member comprising a plurality of fibers having a modulus greater than 200 GPa and a density less than 2.0 g/cc, wherein said reinforcing member has a cross-sectional area which is greater than a cross-sectional area of said cavity.

24. An aerial optical cable as claimed in claim 23, wherein said reinforcing member has cross-sectional area which is greater than a cross-sectional area of said cavity.

25. An aerial optical cable as claimed in claim 23, further comprising a water absorbent material disposed in said cavity and surrounding said optical fiber.

26. An aerial optical cable as claimed in claim 25, wherein said water absorbent material comprising one of polyacrylates with carboxylate functional groups, partially neutralized polyacrylic acid, and polyacrylamides, or copolymers of polyacrylates with carboxylate functional groups, partially neutralized polyacrylic acid, or polyacrylamides.

27. An aerial optical cable as claimed in claim 23, further comprising a gel material is disposed in said cavity and surrounding said optical fiber.

28. An aerial optical cable as claimed in claim 27, wherein said gel material comprises at least one silicone, mineral, polyolefin, and a polyol oils combined with a polymeric thixotropy modifier of pyrogenic silica.

29. An aerial optical cabyle as claimed in claim 23, wherein said jacket body comprises a plastic material that does not contain phthalate platicizers which can migrate to a coating of said optical fiber.

30. An aerial optical cable as claimed in claim 29, wherein said plastic material comprises one of polyvinyl chloride, polyethelene and polypropolyene, or a copolymer comprising polyethelene and polypropolyene.

31. An aerial optical cable as claimed in claim 23, wherein said reinforcing member comprises a plurality of polybenzoxazole fibers.

32. An aerial optical cable as claimed in claim 23, wherein said optical fiber has an excess fiber length of 0.0 to 0.5%.

* * * * *